(12) United States Patent
Hoshi

(10) Patent No.: US 6,414,864 B1
(45) Date of Patent: Jul. 2, 2002

(54) CIRCUIT FOR REDUCING STANDBY POWER OF ELECTRIC APPARATUS

(75) Inventor: Kazuo Hoshi, Tokyo (JP)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/709,304

(22) Filed: Nov. 13, 2000

(30) Foreign Application Priority Data

Nov. 11, 1999 (JP) ............................................ 11-321462

(51) Int. Cl.[7] ................................................ H02M 7/00
(52) U.S. Cl. ............................................ 363/69; 363/90
(58) Field of Search ............................. 363/89, 84, 90, 363/125, 65, 67, 69; 365/227

(56) References Cited

U.S. PATENT DOCUMENTS 5,353,215 A * 10/1994 Dinwiddie et al. ......... 315/411

FOREIGN PATENT DOCUMENTS

| GB | 2257859 | 1/1993 |
| GB | 2341500 | 3/2000 |
| JP | 11341397 | 12/1999 |

* cited by examiner

*Primary Examiner*—Jessica Han
*Assistant Examiner*—Gary L. Laxton
(74) *Attorney, Agent, or Firm*—Birch, Stewart, Kolasch & Birch, LLP

(57) ABSTRACT

The present invention relates to a circuit for reducing standby power by converting low power outputted from an AC power supply into DC power. The standby power redundancy circuit of the invention reduces standby power by receiving AC power through a reactance device, receiving remote control data from a remote control, connecting a microcomputer for exclusive use for a standby power supply to a first side of an AC power supply, and then reducing the power consumption of a main microcomputer of a main body of a set to '0' using the micro computer.

5 Claims, 3 Drawing Sheets

CIRCUIT FOR REDUCING STANDBY POWER OF ELECTRIC APPARATUS

BACKGROUND OF THE INVENTION

1. Field of the Invention

The present invention relates to a circuit for reducing standby power by converting low power outputted from an AC power supply into DC power, and more particularly, to a standby power redundancy circuit for an electric apparatus which reduces standby power by connecting a microcomputer for exclusive use for a standby power supply to a first side of an AC power supply, and then reducing the power consumption of a main microcomputer of a main body of a set to '0' using the micro computer.

2. Description of the Background Art

FIG. 1 is a block diagram illustrating a standby power redundancy circuit according to conventional art, which is divided into a first side and a second side by a power transmission/switching regulator 103 and a standby transmitter 111. As illustrated therein, the standby power redundancy circuit includes: a standby transmitter 111 receiving AC power from an AC power input unit 101 and converting the same into low voltage; a rectifying unit 110 receiving the converted low voltage and converting the same into DC voltage; a power switch 102 for interrupting (turning on/off) the AC power from the AC power input unit 101; a power transmission/switching regulator 103 receiving the AC power and converting the same into low voltage, in the case that the power switch 102 outputs the AC power; a rectifying unit 104 receiving the converted low voltage, converting the same into DC voltage, and outputting it to a main circuit; diodes 105 and 109 rectifying the DC voltage outputted from the rectifying units 104 and 110; a remote control receiving unit 107 receiving a power-on data outputted from a remote control transmission unit (not shown) upon receipt of the rectified DC voltage and outputting the same; a microcomputer 106 outputting a switching control signal upon receipt of the power-on data; a switch driving unit 108 outputting a switch control signal in order to control the turning on/off of the power switch according to the switching control signal; and a pull-up resistor 106-1 receiving the rectified DC voltage. The operation of them will now be described in detail.

First, the standby transmitter 111 receives AC power outputted from the AC power input unit 101 and converts the same into low voltage.

The rectifying unit 110 converts the converted low voltage into DC voltage, said converted DC voltage is rectified by the diode 109, and then is supplied into the switch driving unit 108, remote control receiving unit 107, microcomputer 106, and pull-up resistor 106-1. In this case, as illustrated therein, since the power switch 102 is in the off state, the voltage is not supplied into the main circuit, and the main body of the set is in the power-off state(standby state).

Here, the standby state is referred to as the state in which the power on/off is possible when a remote control is used in the power-off state of the main body of the set of the main circuit. In other words, since the power switch 102 is in the off state, power outputted from the AC power input unit 101 is not supplied into the main circuit via the power transmitter 103 and the rectifying unit 104.

In this state, when a user transmits power-on data from the remote control (not shown) to the remote control transmission unit 107, the remote control unit 107 transmits the power-on data outputted from the remote control transmission unit to the microcomputer 106. The microcomputer 106 outputs a switching control signal (power on/off signal) to the switching driving unit 108 upon receipt of the power-on data. Here, the microcomputer 106 outputs a variety of control signals (A) and a switching control signal (B). The variety of control signals (A) are used for various control of each element, and the switching control signal (B) is used for controlling the switch driving unit 108.

Afterwards, the switch driving unit 108 outputs a switch control signal (D) in order to control the on/off of the power switch 102 according to the switching control signal.

In this case, when the main body of the set (main circuit) is powered off, e.g., it is in the standby state, the reason why voltage needs to be supplied into the remote control receiving unit 107 and the microcomputer 106 is that the main body of the set has to be powered on, and the timer in the microcomputer 106 has to be operated, in the case that there is a power on/off function operated by the timer.

In this conventional method, since a first side coil of the standby transmitter 111 of the standby state is directly connected to the AC power input unit 101, excitation current always flows in the first side coil. As the result, power is consumed even in the idling condition.

The excitation current is especially large in case of comparison with the current flowing in loads of the standby state (that is, microcomputer, remote control receiving unit, etc.) even in the idling condition. As the result, the AC-DC conversion efficiency is deteriorated, and standby power is consumed by 3~5W. In this case, the consumption is mostly the excitation current. In addition, in the case that standby power is less than 100 [mW], there is a necessity for considering the pull-up resistor 106-1 of the microcomputer 106 and the power consumption (100 [mW]) of the microcomputer 106.

In this way, by using the standby transmitter, the AC-DC conversion efficiency is lowered, and the power consumption is large, e.g. 3~5 W (mostly the excitation current). In addition, in case of development with a purpose set on standby power of less than 100 [mW], the microcomputer is operated in the standby state. Thus, there occurs a problem that since power of 100 [mW] is consumed, and it is impossible to reduce standby power below 100 [mW].

SUMMARY OF THE INVENTION

Accordingly, it is an object of the present invention to provide a standby power redundancy circuit for an electric apparatus which reduces standby power by connecting a microcomputer for exclusive use for a standby power supply to a first side of an AC power supply, and then reducing the power consumption of a main microcomputer of a main body of a set to '0' using the micro computer.

To achieve the above object, in a power circuit having a power switch of a main body of a set of the electric apparatus connected to a first side of an AC power supply and a power transmission/switching regulator of the main body of the set connected to a second side thereof, there is provided a standby power redundancy circuit for an electric apparatus according to the present invention which is characterized in that: a standby power redundancy circuit of the standby state in which the power on/off is enabled using a remote control receives AC power through a reactance device, receives a remote control data from the remote control, connects an exclusive microcomputer for controlling the on/off of the power switch by a switch driving unit to a first side of the AC power supply, and then drive only the exclusive micro computer in the standby state, in the case that the power switch is turned off and the main body of the set is powered off.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
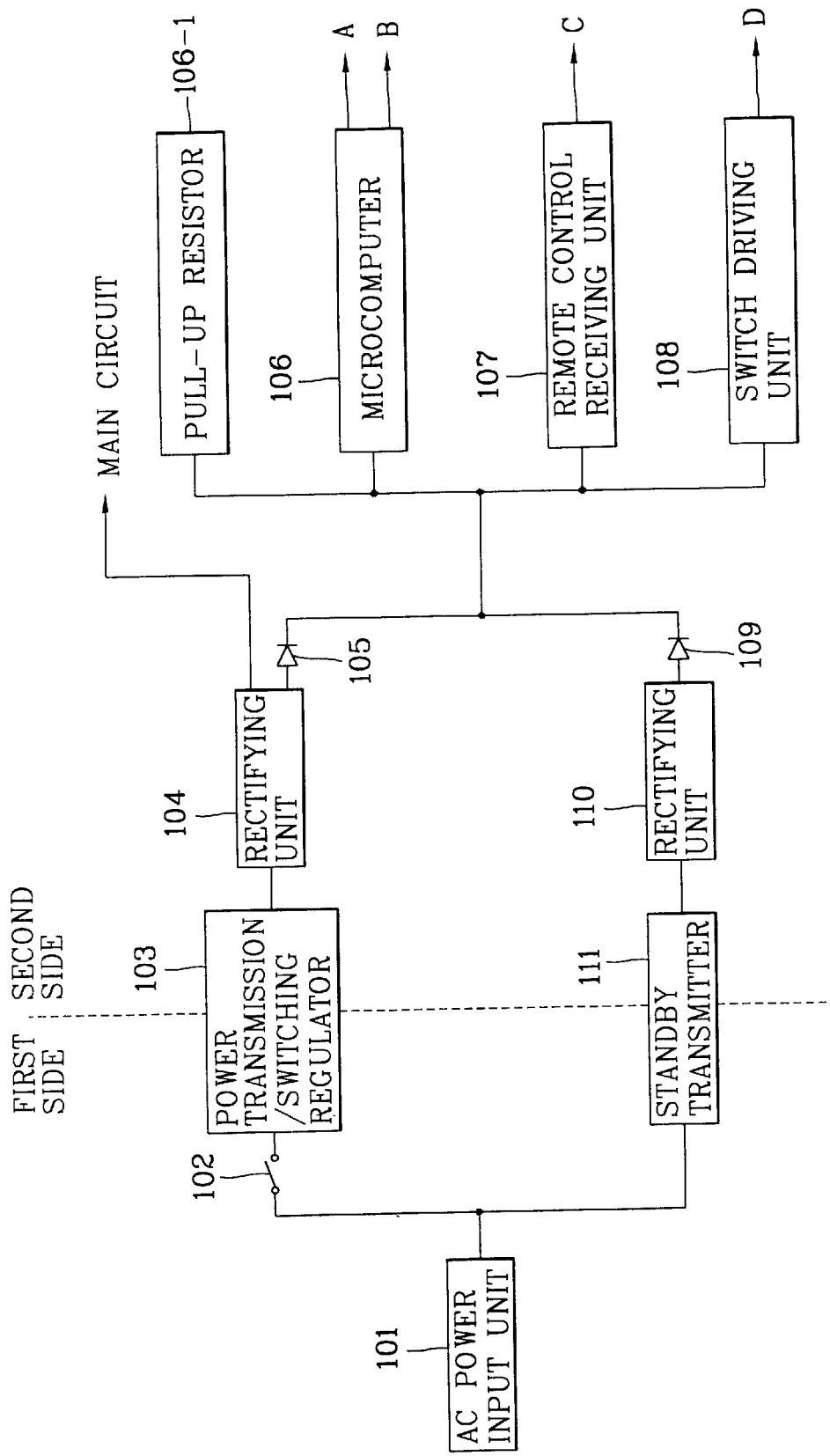
FIG. 1 is a block diagram illustrating a standby power redundancy circuit according to the conventional art.
Figure 2:
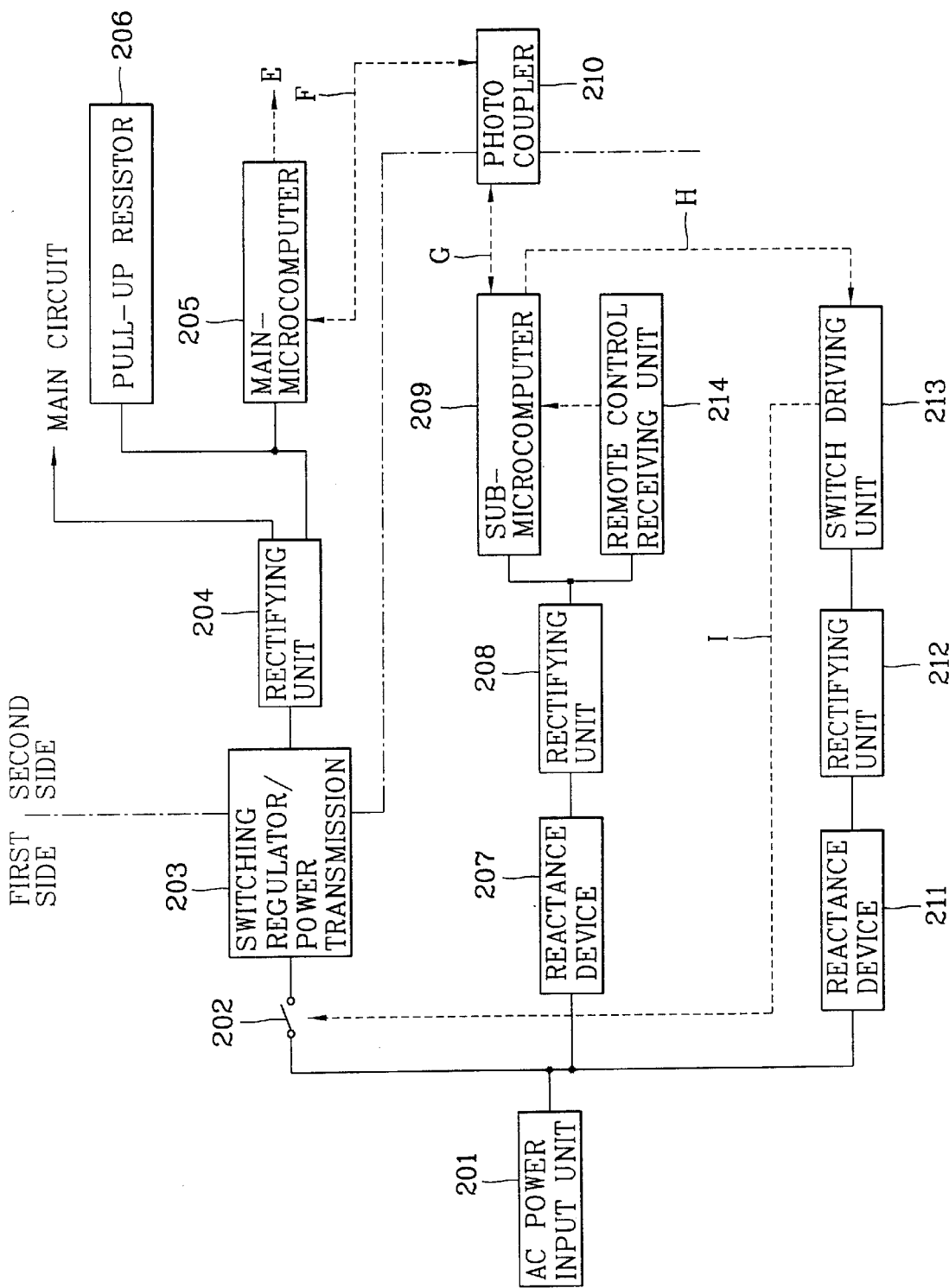
FIG. 2 is a block diagram illustrating a standby power redundancy circuit according to one embodiment of the present invention.

FIG. 2 is a block diagram illustrating a standby power redundancy circuit according to one embodiment of the present invention. As illustrated therein, the part shown in dotted line indicates a signal system. In other words, it indicates various control signals (A) outputted from a main microcomputer 205, remote control data (F) received and transmitted between a photo coupler 210 and the main microcomputer 205, remote control data (G) received and transmitted between the photo coupler 210 and a sub microcomputer 209, switch control signal (H) outputted from the sub microcomputer 209 to a switch driving unit 213, and switch control signal (I) outputted from the switch driving unit 213 to a power switch.

The present invention has the following two essentials.

First, to make power low (10 [mW]) by reducing power dissipation at AC-DC conversion from a utility power supply.

Second, to reduce standby power by connecting a microcomputer (sub microcomputer) 209 for exclusive use for reducing standby power to a first side of an AC power supply, and operating only the sub microcomputer 209 in the standby state.

Accordingly, when a main microcomputer is in the standby state, the power consumption is allowed to be 0 [W].

The thusly configured operation will now be described.

First, AC power is supplied from the AC power input unit to a reactance device 270 for a voltage reducing unit. At this time, the voltage drop by the reactance device 207 is determined by the loss of the rectifying unit 208 and load current (sub microcomputer 209, remote control receiving unit, and the like). That is, the voltage drop by the reactance device 207 can be expressed as follows.

impedance→$Zr=1/\omega C$, $\omega=2\pi f$ dropping voltage of reactance device→$Vr=Zr \times Ir$     [Mathematical Formula 1]

wherein, f designates a frequency, and Ir designates a current flowing in the reactance.

effective power of reactance component→effective power=$Vr \times Ir \times \cos\theta$     [Mathematical Formula 1]

wherein, in the case that the effective power consists of only reactance components, $\theta=90°$. That is, $\cos\theta=0°$.

Thus, in case of ideal reactance, $\cos\theta=0°$, whereby the effective power becomes 0 [W]. However, in an actual circumstance, when the load current is a number of [mA], the power loss of the number of [mW] occurs.

In addition, in case of the standby state, the main micro computer 205 and other main circuit has the power consumption of 0 [W].

In the present invention, the sub microcomputer 209 for exclusive use for standby power is connected to the first side of the AC power supply. The sub micro computer 209 analyzes and discriminates remote control data from the photo coupler 210 which is a combination of a photo transistor and a photo diode, and has a timer function of measuring a predetermined time in the standby state.

In addition, in case of the standby state, since only a standby power circuit is operated, the main microcomputer 209 and the main circuit turn into the power off state, even though the reactance devices 207 and 211, rectifying units 208 and 212, sub micro computer 209, and remote control receiving unit 214 are in the operating state.

The operation of being turned from the standby state into the power on state includes the case of transmitting power on data outputted from the remote control receiving unit (not shown) to the remote control receiving unit 214 and the case that the switch driving unit 213 turns on the power switch 202 according to a control signal (H) outputted from the sub microcomputer 209, when the timer is turned on by the timer on function of the sub microcomputer 209.

Hereinafter, in the case that the power switch 202 is turned on, data outputted from the remote control transmission unit is outputted from the remote control receiving unit 214 to the main microcomputer 205 via the sub microcomputer 209 and the photo coupler 210. That is, the main micro computer performs various controls upon receipt of the data. Here, the photo coupler 210 is installed for the purpose of insulation of the first side and second side of the AC power supply.

Figure 3:
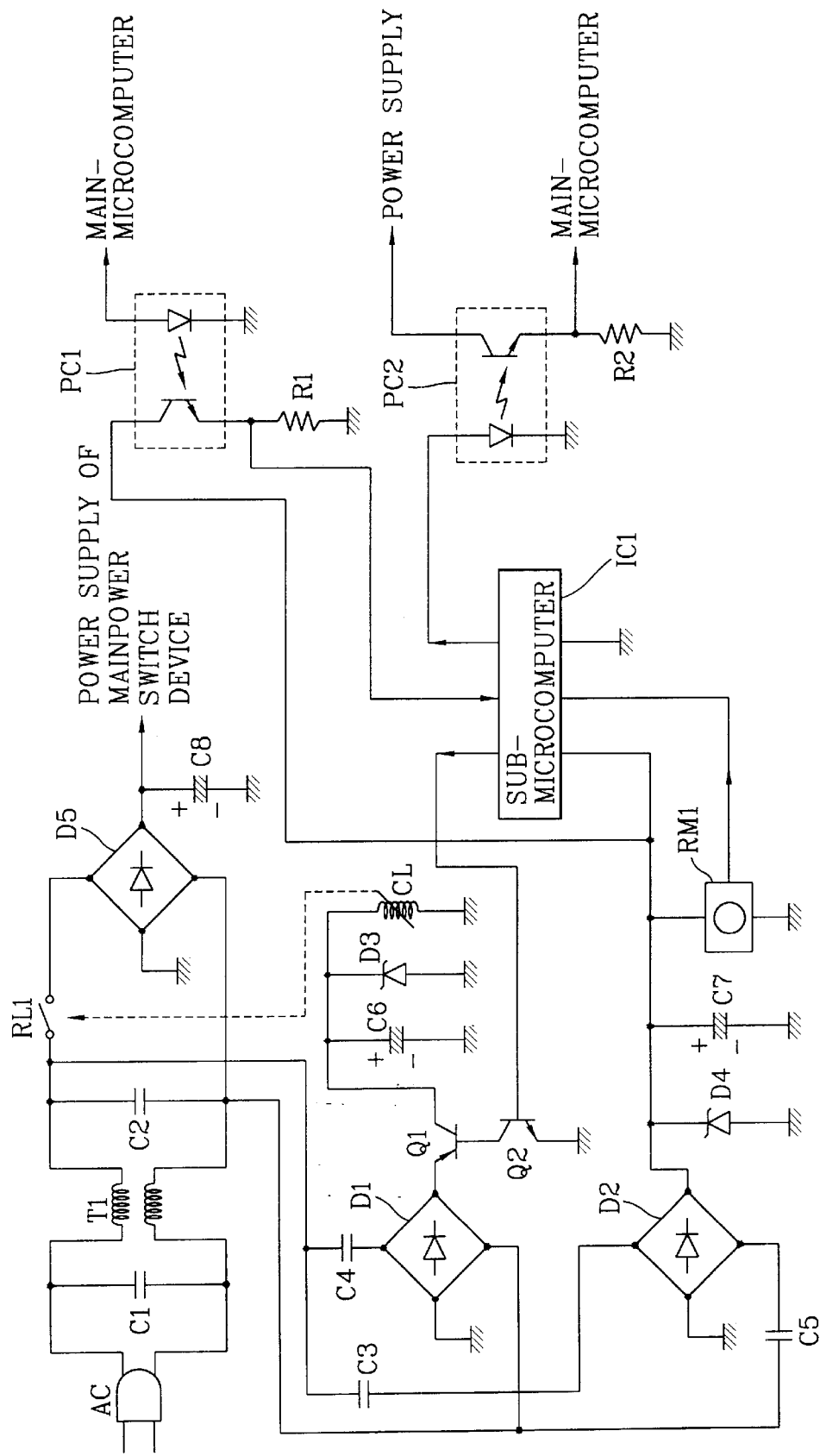
FIG. 3 is a circuit diagram illustrating the construction as in FIG. 2 in detail.

FIG. 3 is a circuit diagram illustrating the construction as in FIG. 2 in detail, of which the operation will now be described in detail.

First, condensers C1 and C2 and a transmitter T1 constructs a noise filter for removing noise components contained in the AC power supply supplied from the AC power supply input unit AC and from the inside of the set.

Afterwards, when a power switch RL1 is turned on, a diode D5 converts the AC voltage from which the noise components are removed into DC voltage, thus supplying power into the main body of the set.

Hereinafter, the standby power circuit will now be described in detail.

First, the standby power supply circuit is allocated at the rear of the condensers C1 and C2 and transmitter T1 constructing the noise filter with respect to the input of AC power. The standby power supply circuit includes condensers C3, C4, and C5 used for voltage drop by the reactance devices, rectifying units D1 and D2, sub microcomputer IC1 (corresponding to 209), remote control receiving unit RM1 (corresponding to 214), photo couplers PC1 and PC2 (corresponding to 210), switch driving circuits Q1 and Q2 (corresponding to 213).

The method for supplying power with respect to the remote control receiving unit RM1 and the sub microcomputer IC1 will now be described hereinafter.

First, the rectifying unit D2 receives AC voltage from the condensers C3 and C5 and outputs the same by rectifying it. Here, in case of no-load, since AC voltage (effective value)×$\sqrt{2}$=DC voltage, thus becoming a high voltage. Meanwhile, in case of making a load value smaller (increasing current), the voltage drop of a capacitor component is increased while the voltage of the load is decreased.

Meanwhile, the effective power can be expressed as follows.

Effective Power→$P=VI \cdot \cos\theta$     [Mathematical Formula]

In this case, in the case that the effective power consists of reactance devices, $\theta=90°$ and $\cos 90=0°$, whicih will be described in more detail hereinafter.

The condensers C3 and C5 are connected to the sub microcomputer IC1, remote control receiving unit RM1, and the terminal of a Zener diode D4 for thereby rectifying the voltage flowing in the devices IC1, RM1, and D4, so that the voltage should become a rated voltage. The total amount of current flowing in the sub microcomputer IC1 and the remote control receiving unit RM1 is 1~3 [mW]. Hence, the power consumption becomes 10~15 [mW].

Next, with a relay driving circuit including a condenser C6, Zener diode D3, coil CL, there is almost no power consumption, since an input of AC power is converted into DC voltage by the condenser C4 and the rectifying unit D1, and thus a transistor Q1 is turned off. Therefore, the amount of standby power is identical to that of the total amount of the load of scores of [mW], power loss due to the reactance device, and power loss due to the rectifying diode. With the respect to the loss of the reactance device, if the standby power consists of only reactance components, there is no loss. However, it contains more or less resistance, a power loss of scores of [mW] occurs.

Therefore, the standby power (P) can be represented as follows.

$$\text{Standby power }(P)=\text{load power}+\text{loss of reactance device}+\text{loss of rectifying diode} \quad \text{[Mathematical Formula]}$$

In addition, a condenser C7 serves to suppress the noise filter and voltage fluctuation. In this case, the condenser C7 is a large scale electrostatic condenser.

Meanwhile, in case of inputting rated voltage into the Zener diode D4, it is possible to reduce power loss by setting the current flowing in the Zener diode D4 to be minimized.

In case of controlling power by the sub microcomputer IC1, the sub microcomputer IC1 analyzes remote control data inputted into the remote control receiving unit RM1, and operates a transistor Q2 upon receipt of power on/off data. At this time, in the case that the transistor Q2 is operated, a transistor Q1 is operated to thus turn on/off a relay RL1.

Here, the transistor is connected to a voltage supplying of a relay coil.

Meanwhile, in the case that the transistor Q1 is connected to the earth side of the relay coil, there occurs overvoltage. The photo coupler PC transmits remote control data to the main microcomputer. The photo coupler PC1 transmits data stored in an EEPROM in the main microcomputer to the sub microcomputer IC1.

As described above, the present invention has an effect of reducing a standby power of an electric apparatus by connecting the sub microcomputer for controlling the on/off of the power switch to the first side of the AC power supply, and then operating only the sub microcomputer in the standby state.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A power supply circuit for an electric apparatus having a main microcomputer for controlling said apparatus, said power supply circuit for connecting to a AC power supply, said power supply circuit comprising a standby redundancy circuit, a power switch and a power transmission/switching regulator for a main body of the electric apparatus, said standby redundancy circuit being used when said apparatus is in a standby state in which power on/off is enabled using a remote controller, said standby redundancy circuit comprising:

a reactance device to receive AC power;

means for receiving remote control signals from the remote controller;

a sub-microcomputer for exclusive use by said standby redundancy circuit; and a switch driving unit for controlling the switching of said power switch, said driving unit controlled by said sub-microcomputer, wherein in the standby state in which the power switch is turned off and the main body of the apparatus is powered off, the sub-microcomputer is arranged to be driven but not said main microcomputer.

2. The circuit according to claim 1, wherein the standby power redundancy circuit further comprises an AC/DC conversion means for dropping the inputted AC power to a low AC power using voltage drop by the reactance device, and rectifying the same.

3. The circuit according to claim 1, wherein the sub-microcomputer has the function of discriminating the remote control signals.

4. The circuit according to claim 1, wherein a communication between the sub-microcomputer and the main microcomputer in the main body of the apparatus is achieved through a photo coupler which is a combination of a photo transistor and a photo diode.

5. The circuit according to claim 1, wherein the sub-microcomputer has a timer function of measuring a predetermined time elapsing in the standby state.

* * * * *